UNITED STATES PATENT OFFICE.

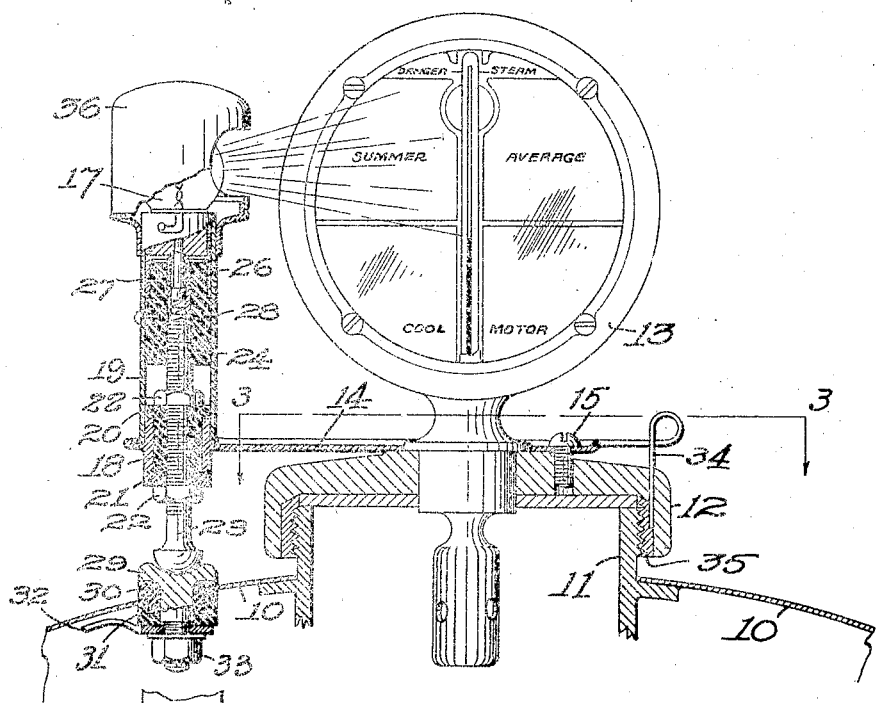
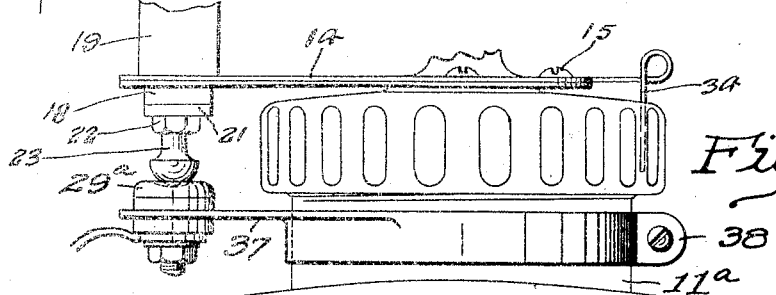
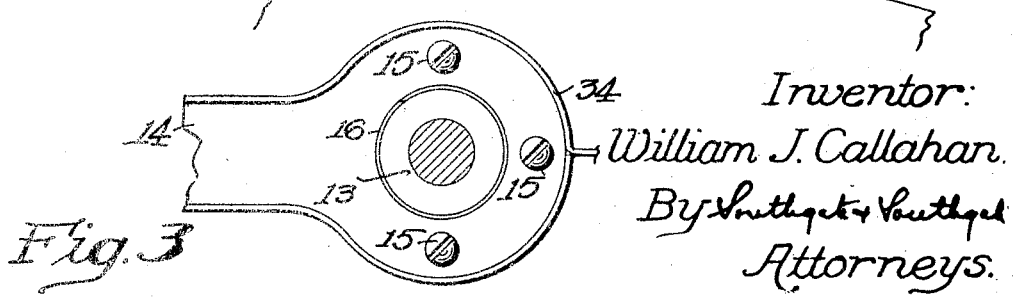

WILLIAM J. CALLAHAN, WORCESTER, MASSACHUSETTS.

AUTOMOBILE INSTRUMENT LIGHT.

1,411,266.          Specification of Letters Patent.     Patented Apr. 4, 1922.

Application filed January 24, 1921. Serial No. 439,349.

*To all whom it may concern:*

Be it known that I, WILLIAM J. CALLAHAN, a citizen of the United States, residing at Worcester, in the county of Worcester and State of Massachusetts, have invented a new and useful Automobile Instrument Light, of which the following is a specification.

This invention relates to an automobile instrument light and particularly to improved devices for supporting and forming electrical contact with a light illuminating a motometer or other similar device on the radiator cap. It is essential that such a light should be so supported that it may be readily removed with the radiator cap and that when replaced the necessary contact will be established without personal attention.

It is the object of my invention to provide improved devices for thus supporting and contacting with an automobile instrument light, including certain novel constructions by which the contact may be easily made and securely maintained.

My invention further relates to arrangements and combinations of parts which will be hereinafter described and more particularly pointed out in the appended claims.

Preferred forms of my invention are shown in the drawings, in which—

Fig. 1 is a side elevation, partly in section, of my improved light and support;

Fig. 2 is a side elevation of a certain modification, and

Fig. 3 is a partial plan view taken along the line 3—3 in Fig. 1.

Referring to the drawings, I have indicated a portion of a radiator casing 10, a radiator filler pipe 11, and a radiator cap 12 on which is mounted a motometer 13 or other similar instrument. A spring plate 14 is secured to the top of the radiator cap 12, preferably by screws 15 (Fig. 3), the plate having an opening 16 around the base of the motometer 13.

An electric light 17 is supported on the spring plate 14, preferably by the following construction. A metal sleeve 18 is fixed to the end of the arm 14 and a metal casing 19 fits over the sleeve 18 and engages the plate 14. An insulating bushing 20 and washer 21 are clamped to the sleeve 18 by nuts 22 on a contact rod 23 extending upward within the casing 19 and preferably threaded into an insulating plug 24 fixed in the casing 19.

The light 17 is secured within the upper end of the casing 19, as by the usual bayonet lock, and one terminal of the light is connected through the casing 19 to the plate 14. The other terminal is connected through a yielding contact pin 26 in a sleeve 27, and through a spring 28 to the threaded rod 23.

A contact stud 29 is mounted on a fixed portion of the automobile in position for engagement by the depending head of the rod 23 when the cap 12 is in normal position. The head of the stud 29 is preferably recessed to receive the head of the rod 23 and is insulated from the casing 10 by fiber bushings 30 and 31. A wire 32 is secured to the stud 29 by a nut 33 and thus connected to one terminal of the light 17.

The cap 12 upon which the plate 14 is mounted is commonly of non-conducting material, the plate being connected by a spring wire 34 to a metallic threaded bushing 35 within the cap, which bushing engages the filler pipe 11 and thus completes the electric circuit.

A hood 36 is provided for the light 17, by which its rays are directed on the instrument and are shielded from the eyes of the driver.

In Fig. 2 I have shown a slight modification in which the contact stud 29ª is mounted on an arm 37 which is secured to the filler pipe 11ª by a clamp 38.

Having thus described my invention, it will be seen that I have provided a simple and practical construction by which electrical connections for the light 17 will be automatically established by turning the radiator cap to its normal position. The yielding spring plate 14 permits the head of the rod 23 to snap into place in the recessed stud 29 and to be thereafter yieldingly held in this position. The contact pressure between the parts may be regulated by means of the nuts 22 by which the rod 23 may be raised or lowered as necessary.

Having thus described my invention it will be evident that changes and modifications can be made therein by those skilled in the art within the spirit and scope of my invention as set forth in the claims, and I do not wish to be otherwise limited to the details herein disclosed but what I claim is:—

1. In an automobile, a radiator having a filler pipe, a removable radiator cap threaded thereon, an electric light supported on said radiator cap, a contact member on said cap connected to said light, and a co-operating insulated contact member secured to a relatively fixed part of said automobile, said contact members co-operating to yieldingly retain said radiator cap in a definite angular position on said radiator.

2. In an automobile, a radiator cap, a spring plate secured to said cap, an electric light mounted on said spring plate and having a depending contact projection, and a cooperating contact member mounted on a fixed portion of the automobile in position for yielding engagement by said projection.

3. In an automobile, a radiator cap, a spring plate secured to said cap, a casing mounted on said plate and extending upwardly therefrom, an electric light mounted in said casing, a depending contact rod mounted on said plate within said casing and insulated from both plate and casing, a relatively fixed terminal with which said contact rod yieldingly engages, and a separate electrical connection to said plate.

4. In an automobile, a radiator cap having a threaded metal bushing, an electric light, a spring plate supporting said light, means to secure said plate to said cap, means to connect said plate to said metal bushing, a lamp contact depending from said plate, and a terminal mounted on a fixed part of the automobile and adapted to be yieldingly engaged by said depending contact.

5. In an automobile, a radiator having a filler pipe, a radiator cap threaded thereon, an electric light supported on said cap, an electrical connection between said light and a metallic portion of said automobile, a contact member also connected to said light, and a co-operating insulated contact member secured to a relatively fixed part of said automobile, one of said contact members being recessed to receive a portion of the other contact member and being effective thereby to yieldingly prevent angular displacement of said radiator cap.

6. In an automobile having a radiator, a filler pipe and a radiator cap threaded thereon, in combination, an electric light support, means to secure said support on said cap, a depending contact projection on said support, and a terminal positioned for engagement by said projection, said terminal being mounted on a device clamped to said filler pipe.

In testimony whereof I have hereunto affixed my signature.

WILLIAM J. CALLAHAN.